(12) United States Patent
Cronin

(10) Patent No.: US 10,944,448 B2
(45) Date of Patent: Mar. 9, 2021

(54) MANAGING NFC DEVICES BASED ON DOWNLOADED DATA

(71) Applicant: BLAZER AND FLIP FLOPS, INC., San Diego, CA (US)

(72) Inventor: John Cronin, Bonita Springs, FL (US)

(73) Assignee: BLAZER AND FLIP FLOPS, INC., San Diego, CA (US)

(*) Notice: Subject to any disclaimer, the term of this patent is extended or adjusted under 35 U.S.C. 154(b) by 0 days.

(21) Appl. No.: 16/503,358

(22) Filed: Jul. 3, 2019

(65) Prior Publication Data
US 2019/0326957 A1 Oct. 24, 2019

Related U.S. Application Data

(63) Continuation of application No. 15/967,068, filed on Apr. 30, 2018, now Pat. No. 10,348,368, which is a (Continued)

(51) Int. Cl.
*H04B 5/02* (2006.01)
*H04L 12/28* (2006.01)
(Continued)

(52) U.S. Cl.
CPC ............. *H04B 5/02* (2013.01); *H04B 5/0056* (2013.01); *H04L 12/2807* (2013.01);
(Continued)

(58) Field of Classification Search
CPC ...... H04B 5/02; H04B 5/0056; H04B 5/0031; H04W 4/02; H04W 4/025; H04W 4/029; H04W 48/04; H04W 4/023; H04W 4/80;
G06Q 20/3224; G06Q 20/3278; G05B 2219/23161; H04L 12/2807; H04L 12/2814; H04M 1/72572
(Continued)

(56) References Cited

U.S. PATENT DOCUMENTS 5,473,143 A 12/1995 Vak et al.
6,874,126 B1 3/2005 Lapidous
(Continued)

FOREIGN PATENT DOCUMENTS

CN 103679475 3/2014
EP 2 533 186 12/2012
(Continued)

OTHER PUBLICATIONS

U.S. Appl. No. 14/970,311 Office Action dated Oct. 2, 2019.
(Continued)

*Primary Examiner* — Devan A Sandiford
(74) *Attorney, Agent, or Firm* — Polsinelli LLP

(57) ABSTRACT

The present invention includes systems and methods for a near field communication (NFC) center that stores NFC information for various NFC devices and products. The NFC information is supplied by the device or product itself or from the manufacturer of the device or product. A user is then able to obtain the NFC information through their user mobile device from the NFC center. With the NFC information, the user can manage one or more NFC devices in real time.

17 Claims, 10 Drawing Sheets

Related U.S. Application Data continuation of application No. 14/970,102, filed on Dec. 15, 2015, now Pat. No. 9,985,699.

(60) Provisional application No. 62/092,671, filed on Dec. 16, 2014.

(51) Int. Cl.
   *H04B 5/00* (2006.01)
   *H04W 4/02* (2018.01)

(52) U.S. Cl.
   CPC ........... *H04L 12/2814* (2013.01); *H04W 4/02* (2013.01); *G05B 2219/23161* (2013.01)

(58) Field of Classification Search
   USPC ....................................................... 455/41.1
   See application file for complete search history.

(56) References Cited

U.S. PATENT DOCUMENTS

| | | |
|---|---|---|
| 6,973,172 B1 | 12/2005 | Bitove et al. |
| 7,828,204 B2 | 11/2010 | Fiebiger et al. |
| 7,832,646 B1 | 11/2010 | Leason |
| 7,844,512 B2 | 11/2010 | Richards et al. |
| 8,065,190 B2 | 11/2011 | Collas et al. |
| 8,105,772 B2 | 4/2012 | Mardikar et al. |
| 8,306,860 B2 | 11/2012 | Dunsmore et al. |
| 8,474,701 B1 | 7/2013 | Meek et al. |
| 8,494,913 B2 | 7/2013 | Cavagnaro |
| 8,498,900 B1 | 7/2013 | Spirin et al. |
| 8,577,803 B2 | 11/2013 | Chatterjee et al. |
| 8,690,054 B1 | 4/2014 | Cummins et al. |
| 8,714,439 B2 | 5/2014 | Brendell et al. |
| 8,718,554 B2 | 5/2014 | Abel |
| 8,762,211 B2 | 6/2014 | Killian et al. |
| 8,783,561 B2 | 7/2014 | Wesley |
| 8,788,324 B1 | 7/2014 | Shetty et al. |
| 8,799,085 B2 | 8/2014 | Fisher |
| 8,805,726 B2 | 8/2014 | Fisher |
| 8,811,895 B2 | 8/2014 | Reisgies et al. |
| 8,954,004 B1 | 2/2015 | Wang et al. |
| 9,582,826 B2 | 2/2017 | Calman et al. |
| 9,646,303 B2 | 5/2017 | Karpenko et al. |
| 9,672,511 B2* | 6/2017 | Lim .................. G06Q 20/3278 |
| 9,734,091 B2 | 8/2017 | Kadi et al. |
| 9,985,699 B1 | 5/2018 | Cronin |
| 9,990,621 B1 | 6/2018 | Ng et al. |
| 10,204,335 B1 | 2/2019 | Donavalli et al. |
| 10,262,311 B1 | 4/2019 | Cronin |
| 10,262,318 B1 | 4/2019 | Cronin |
| 10,348,368 B2 | 7/2019 | Cronin |
| 10,516,964 B2* | 12/2019 | Dotan-Cohen ... H04M 1/72572 |
| 10,580,011 B1 | 3/2020 | Cronin |
| 10,679,207 B1 | 6/2020 | Huffines |
| 2002/0026348 A1 | 2/2002 | Fowler et al. |
| 2002/0062249 A1 | 5/2002 | Iannacci |
| 2004/0010597 A1 | 1/2004 | Kirschner et al. |
| 2004/0220876 A1 | 11/2004 | Liu |
| 2005/0004839 A1 | 1/2005 | Bakker et al. |
| 2005/0210240 A1 | 9/2005 | Barron |
| 2006/0131390 A1 | 6/2006 | Kim |
| 2006/0206378 A1 | 9/2006 | Ficalora |
| 2007/0022375 A1 | 1/2007 | Walker |
| 2007/0032225 A1* | 2/2007 | Konicek ........... H04M 1/72513 455/417 |
| 2007/0190939 A1 | 8/2007 | Abel |
| 2007/0192198 A1 | 8/2007 | Schwarzkopf |
| 2007/0203850 A1 | 8/2007 | Singh et al. |
| 2008/0011837 A1 | 1/2008 | Wesley |
| 2008/0078831 A1 | 4/2008 | Johnson et al. |
| 2008/0109335 A1 | 5/2008 | Keohane et al. |
| 2008/0120155 A1 | 5/2008 | Pliha |
| 2008/0133351 A1 | 6/2008 | White et al. |
| 2008/0147496 A1 | 6/2008 | Bal et al. |
| 2008/0150678 A1 | 6/2008 | Giobbi et al. |
| 2008/0167017 A1 | 7/2008 | Wentker et al. |
| 2008/0167961 A1 | 7/2008 | Wentker et al. |
| 2009/0082001 A1* | 3/2009 | Rahul ............... H04M 1/72572 455/418 |
| 2009/0132362 A1 | 5/2009 | Fisher et al. |
| 2009/0138365 A1 | 5/2009 | Mueller et al. |
| 2009/0156190 A1 | 6/2009 | Fisher |
| 2009/0192935 A1 | 7/2009 | Griffin et al. |
| 2009/0276305 A1 | 11/2009 | Clopp |
| 2010/0010887 A1 | 1/2010 | Karlin et al. |
| 2010/0082455 A1 | 4/2010 | Rosenblatt et al. |
| 2010/0088149 A1 | 4/2010 | Sullivan et al. |
| 2010/0114677 A1 | 5/2010 | Carlson et al. |
| 2010/0124914 A1* | 5/2010 | Schmidt ............... H04M 1/575 455/415 |
| 2010/0125510 A1 | 5/2010 | Smith et al. |
| 2010/0190437 A1 | 7/2010 | Buhot |
| 2010/0211507 A1 | 8/2010 | Aabye et al. |
| 2010/0211679 A1 | 8/2010 | Kumar et al. |
| 2010/0274691 A1 | 10/2010 | Hammad et al. |
| 2010/0274853 A1 | 10/2010 | Carlson et al. |
| 2010/0309807 A1 | 12/2010 | Rautiainen |
| 2010/0312692 A1 | 12/2010 | Teicher |
| 2011/0016050 A1 | 1/2011 | Evans |
| 2011/0153438 A1 | 6/2011 | Dragt |
| 2011/0167133 A1 | 7/2011 | Jain |
| 2011/0202402 A1 | 8/2011 | Fowler et al. |
| 2011/0218849 A1 | 9/2011 | Rutigliano et al. |
| 2011/0230209 A1* | 9/2011 | Kilian ............... H04M 1/72569 455/456.3 |
| 2011/0238517 A1 | 9/2011 | Ramalingam et al. |
| 2011/0258249 A1 | 10/2011 | Biggs et al. |
| 2011/0276511 A1 | 11/2011 | Rosenberg |
| 2011/0313922 A1 | 12/2011 | Ben Ayed |
| 2011/0320345 A1 | 12/2011 | Taveau et al. |
| 2012/0036076 A1 | 2/2012 | Vanderwall et al. |
| 2012/0078701 A1 | 3/2012 | Woods |
| 2012/0078735 A1 | 3/2012 | Bauer et al. |
| 2012/0089461 A1 | 4/2012 | Greenspan |
| 2012/0101882 A1 | 4/2012 | Todd |
| 2012/0109730 A1 | 5/2012 | Yoder et al. |
| 2012/0136732 A1 | 5/2012 | McMillen et al. |
| 2012/0148077 A1* | 6/2012 | Aldaz .................. H04R 25/558 381/315 |
| 2012/0160912 A1 | 6/2012 | Laracey |
| 2012/0166332 A1 | 6/2012 | Naaman |
| 2012/0185315 A1 | 7/2012 | VanDerheide et al. |
| 2012/0209749 A1 | 8/2012 | Hammad et al. |
| 2012/0221401 A1 | 8/2012 | Brown et al. |
| 2012/0253913 A1 | 10/2012 | Richard |
| 2012/0330744 A1 | 12/2012 | Aissa |
| 2013/0006773 A1 | 1/2013 | Lutnick et al. |
| 2013/0006782 A1 | 1/2013 | Schwarzkopf et al. |
| 2013/0020389 A1 | 1/2013 | Barnett |
| 2013/0059534 A1 | 3/2013 | Sobalvarro et al. |
| 2013/0067546 A1 | 3/2013 | Thavasi et al. |
| 2013/0080241 A1 | 3/2013 | Fisher |
| 2013/0080972 A1* | 3/2013 | Moshrefi .................. G06F 3/048 715/808 |
| 2013/0085835 A1 | 4/2013 | Horowitz |
| 2013/0095755 A1 | 4/2013 | Moreton et al. |
| 2013/0097040 A1 | 4/2013 | Fisher |
| 2013/0110261 A1 | 5/2013 | Lee et al. |
| 2013/0110682 A1 | 5/2013 | Rosenblatt et al. |
| 2013/0132282 A1 | 5/2013 | Shakkarwar |
| 2013/0144715 A1 | 6/2013 | Kranzley et al. |
| 2013/0191213 A1 | 7/2013 | Beck et al. |
| 2013/0191246 A1 | 7/2013 | Calman et al. |
| 2013/0204728 A1 | 8/2013 | Lichterman et al. |
| 2013/0211987 A1 | 8/2013 | Louie et al. |
| 2013/0215467 A1 | 8/2013 | Fein et al. |
| 2013/0218682 A1 | 8/2013 | Alterman et al. |
| 2013/0268378 A1 | 10/2013 | Yovin |
| 2014/0006205 A1 | 1/2014 | Berry et al. |
| 2014/0006272 A1 | 1/2014 | Calman et al. |
| 2014/0058955 A1 | 2/2014 | Calman |
| 2014/0074637 A1 | 3/2014 | Hammad |
| 2014/0074691 A1 | 3/2014 | Bank et al. |

(56) References Cited

U.S. PATENT DOCUMENTS

| | | |
|---|---|---|
| 2014/0081855 A1 | 3/2014 | Hankins et al. |
| 2014/0089178 A1 | 3/2014 | Lee et al. |
| 2014/0089196 A1 | 3/2014 | Paya et al. |
| 2014/0089672 A1 | 3/2014 | Luna et al. |
| 2014/0100983 A1 | 4/2014 | Cavagnaro |
| 2014/0129357 A1 | 5/2014 | Goodwin |
| 2014/0138435 A1 | 5/2014 | Khalid |
| 2014/0172660 A1 | 6/2014 | Louie et al. |
| 2014/0173063 A1 | 6/2014 | Jeong et al. |
| 2014/0180826 A1 | 6/2014 | Boal |
| 2014/0189836 A1 | 7/2014 | Eyler |
| 2014/0201085 A1 | 7/2014 | Brendell et al. |
| 2014/0207680 A1 | 7/2014 | Rephlo |
| 2014/0214673 A1 | 7/2014 | Baca et al. |
| 2014/0222670 A1 | 8/2014 | Concannon |
| 2014/0274014 A1 | 9/2014 | Dodla |
| 2014/0277805 A1 | 9/2014 | Browne et al. |
| 2014/0279474 A1 | 9/2014 | Evans et al. |
| 2014/0298027 A1 | 10/2014 | Roberts et al. |
| 2014/0330654 A1 | 11/2014 | Turney et al. |
| 2014/0337151 A1 | 11/2014 | Crutchfield |
| 2014/0351057 A1 | 11/2014 | Kwon et al. |
| 2014/0351071 A1 | 11/2014 | Hong et al. |
| 2014/0351147 A1 | 11/2014 | Castrechini et al. |
| 2015/0019439 A1 | 1/2015 | Phillips |
| 2015/0073907 A1 | 3/2015 | Purves et al. |
| 2015/0088626 A1 | 3/2015 | Salmon et al. |
| 2015/0088631 A1 | 3/2015 | Mitchell |
| 2015/0095224 A1 | 4/2015 | Blythe |
| 2015/0100443 A1 | 4/2015 | Vann Heerden et al. |
| 2015/0100803 A1 | 4/2015 | Chen et al. |
| 2015/0120473 A1 | 4/2015 | Jung et al. |
| 2015/0127549 A1 | 5/2015 | Khan |
| 2015/0154634 A1 | 6/2015 | Chiu et al. |
| 2015/0156311 A1* | 6/2015 | Adams .............. H04M 1/72572 455/414.1 |
| 2015/0186871 A1 | 7/2015 | Laracey |
| 2015/0220915 A1 | 8/2015 | Rosenberg |
| 2015/0302398 A1 | 10/2015 | Desai et al. |
| 2015/0339318 A1 | 11/2015 | O'Toole et al. |
| 2015/0356551 A1 | 12/2015 | Dogin et al. |
| 2016/0055512 A1 | 2/2016 | Godsey et al. |
| 2016/0057619 A1 | 2/2016 | Lopez |
| 2016/0117667 A1 | 4/2016 | Kang et al. |
| 2016/0125414 A1 | 5/2016 | Desai et al. |
| 2016/0162882 A1 | 6/2016 | McClung |
| 2016/0192123 A1 | 6/2016 | Lim |
| 2016/0275499 A1 | 9/2016 | Gardiner et al. |
| 2016/0321641 A1 | 11/2016 | Cady et al. |
| 2017/0024733 A1 | 1/2017 | Purves |
| 2017/0287321 A1 | 10/2017 | Ann et al. |
| 2017/0295032 A1 | 10/2017 | Shin et al. |
| 2018/0041591 A1 | 2/2018 | Yoden |
| 2018/0050450 A1 | 2/2018 | Parrott et al. |
| 2018/0248589 A1* | 8/2018 | Cronin ..................... H04B 5/02 |
| 2018/0374073 A1 | 12/2018 | Zhao |
| 2019/0172035 A1 | 6/2019 | Cronin |
| 2019/0325426 A1 | 10/2019 | Cronin |
| 2020/0202362 A1 | 6/2020 | Cronin et al. |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

U.S. Appl. No. 14/970,304, John Cronin, NFC Transaction Choices, filed Dec. 15, 2015.
U.S. Appl. No. 14/970,311, John Cronin, NFC Triggered Incentives at Point-of-Sale, filed Dec. 15, 2015.
U.S. Appl. No. 14/970,319, John Cronin, NFC ATM Vending Machine With Added Two Way Non-Financial Data, filed Dec. 15, 2015.
U.S. Appl. No. 14/970,080, John Cronin, NFC Increased Biometrics Based on Transactions Parameters, filed Dec. 15, 2015.
U.S. Appl. No. 14/970,338, John Cronin, Payment Processes With Warranty Options, filed Dec. 15, 2015.
U.S. Appl. No. 16/378,262, John Cronin, Transaction Modification Based on Real-Time Offers, filed Apr. 8, 2019.
U.S. Appl. No. 14/970,125, John Cronin, NFC Transaction With Financial and Non-Financial Data, filed Dec. 15, 2015.
U.S. Appl. No. 14/970,139, John Cronin, Bill Spitting and Account Delegation For NFC, filed Dec. 15, 2015.
U.S. Appl. No. 14/970,144, John Cronin, Automatic Shopping Based on Historical Data, filed Dec. 15, 2015.
Airplus—Mobile Payment—How It Will Transform Corporate Travel and Expense Management, Apr. 18, 2012.
Case Study—Bill Splitting App for Restaurants, 2013.
AuthenTec—AuthenTec Fingerprint Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, 11/28/14.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
Hoyos Labs, Nov. 28, 2014.
i-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC, Payments, Oct. 10, 2013.
Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick Up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12): 2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", Bizfeed, PCWorld, Sep. 6, 2011.
Mobile_Commerce_NFC_Coupons_and_Loyalty Acceptance—Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag FREE—WidgApp Mobile Solutions Tools, Google Play, Jul. 17, 2014.

(56) References Cited

OTHER PUBLICATIONS

NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.
"Pay2You Places: shopping by geolocation", Connexions, Jul. 5, 2013.
Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC maintstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond the Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.
White Pater—The Role of the Trusted Service Manager in Mobile Commerce, Dec. 2013.
Wollenhaupt, Gary; "Five Ways Mobile Technology will Revolutionize ATMs", White Paper ATM MarketPlace, 2013.
U.S. Appl. No. 14/970,304 Office Action dated Jul. 12, 2019.
U.S. Appl. No. 14/970,304 Final Office Action dated Oct. 1, 2018.
U.S. Appl. No. 14/970,304 Office Action dated Jan. 12, 2018.
U.S. Appl. No. 14/970,311 Final Office Action dated Jun. 13, 2019.
U.S. Appl. No. 14/970,311 Office Action dated Apr. 4, 2018.
U.S. Appl. No. 14/970,314 Office Action dated Mar. 8, 2018.
U.S. Appl. No. 14/970,319 Office Action dated Jul. 10, 2019.
U.S. Appl. No. 14/970,319 Final Office Action dated Jan. 28, 2019.
U.S. Appl. No. 14/970,319 Office Action dated Jun. 26, 2018.
U.S. Appl. No .14/970,328 Office Action dated Feb. 14, 2018.
U.S. Appl. No. 14/970,056 Final Office Action dated Nov. 2, 2018.
U.S. Appl. No. 14/970,056 Office Action dated Apr. 5, 2018.
U.S. Appl. No. 14/970,069 Office Action dated Mar. 28, 2018.
U.S. Appl. No. 14/970,080 Office Action dated Aug. 15, 2019.
U.S. Appl. No. 14/970,080 Final Office Action dated Sep. 21, 2018.
U.S. Appl. No. 14/970,080 Office Action dated Feb. 26, 2018.
U.S. Appl. No. 14/970,091 Office Action dated Jun. 1, 2018.
U.S. Appl. No. 14/970,102 Final Office Action dated Nov. 30, 2017.
U.S. Appl. No. 14/970,102 Office Action dated May 1, 2017.
U.S. Appl. No. 15/967,068 Office Action dated Sep. 4, 2018.
U.S. Appl. No. 14/970,338 Final Office Action dated Jan. 25, 2019.
U.S. Appl. No. 14/970,338 Office Action dated Jun. 28, 2018.
U.S. Appl. No. 14/970,340 Office Action dated Apr. 5, 2018.
U.S. Appl. No. 14/970,125 Final Office Action dated Jan. 28, 2019.
U.S. Appl. No. 14/970,125 Office Action dated Jun. 29, 2018.
U.S. Appl. No. 14/970,139 Final Office Action dated Jan. 18, 2019.
U.S. Appl. No. 14/970,139 Office Action dated May 31, 2018.
U.S. Appl. No. 14/970,144 Final Office Action dated Jan. 7, 2019.
U.S. Appl. No. 14/970,144 Office Action dated May 17, 2018.
U.S. Appl. No. 16/808,220, John Cronin, NFC-Based Options Selection, filed Mar. 3, 2020.
Reuter, Thad; "NFC 'Add-On' Links Smart Phones, Contactless Pay", Paris Start-up Technology Vendor, ATM & Debit News. (Years: 2009).
"The Mobile Payments and NFC Landscape: A U.S. Perspective", A Smart Card Alliance Payments Council White Paper, Publication No. PC-11002 (Year: Sep. 2011).
U.S. Appl. No. 14/970,304 Final Office Action dated Apr. 9, 2020.
U.S. Appl. No. 14/970,311 Final Office Action dated Mar. 26, 2020.
U.S. Appl. No. 14/970,319 Final Office Action dated Apr. 6, 2020.
U.S. Appl. No. 16/271,677 Office Action dated Apr. 2, 2020.
U.S. Appl. No. 14/970,080 Final Office Action dated May 7, 2020.
U.S. Appl. No. 16/378,262 Office Action dated Sep. 18, 2020.
U.S. Appl. No. 16/271,677 Final Office Action dated Oct. 1, 2020.
U.S. Appl. No. 14/970,144 Office Action dated Oct. 16, 2020.

* cited by examiner

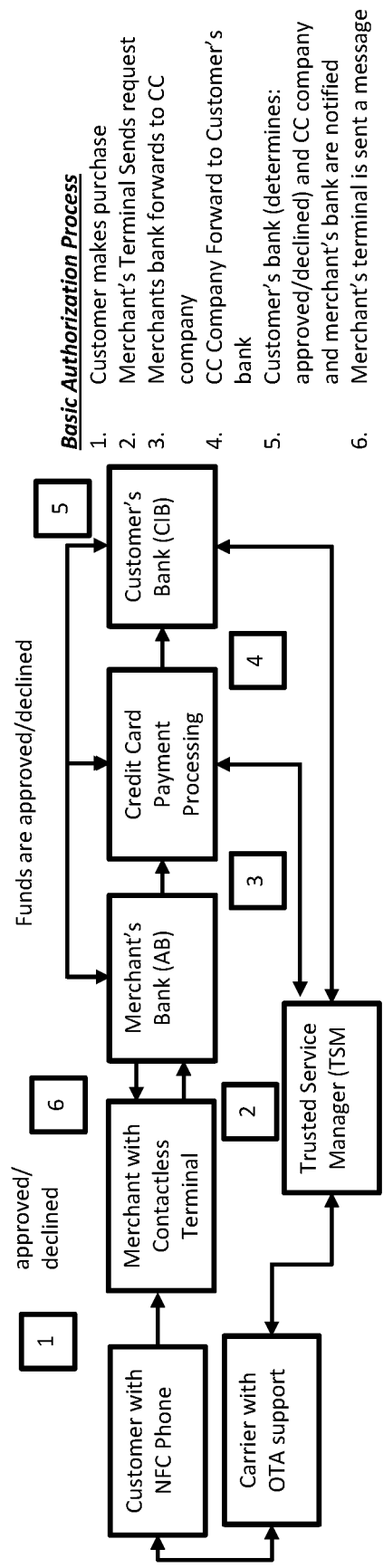
FIG 1A
Prior Art
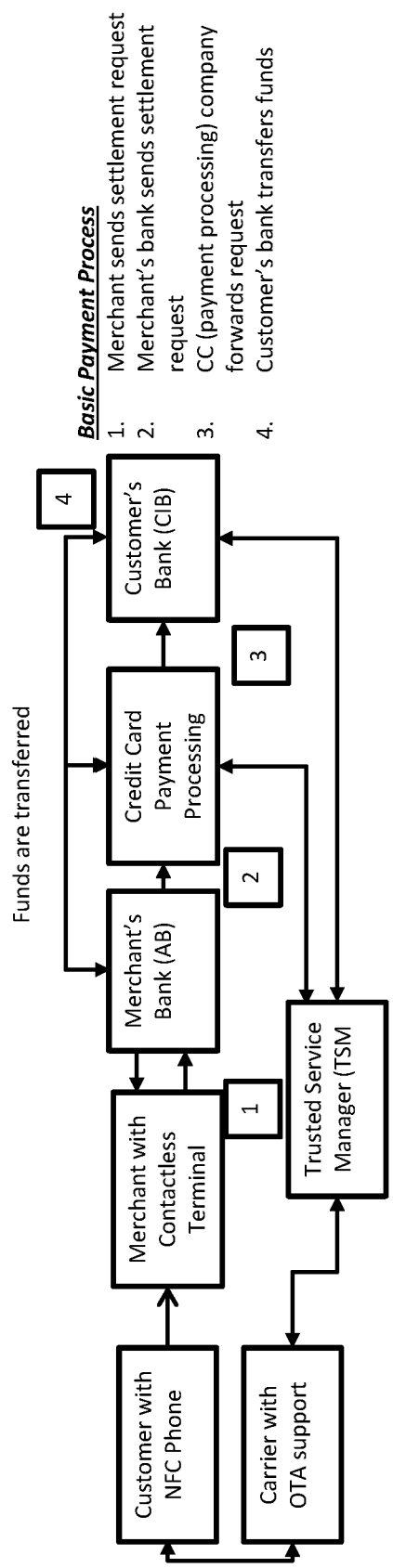
FIG 1B
Prior Art

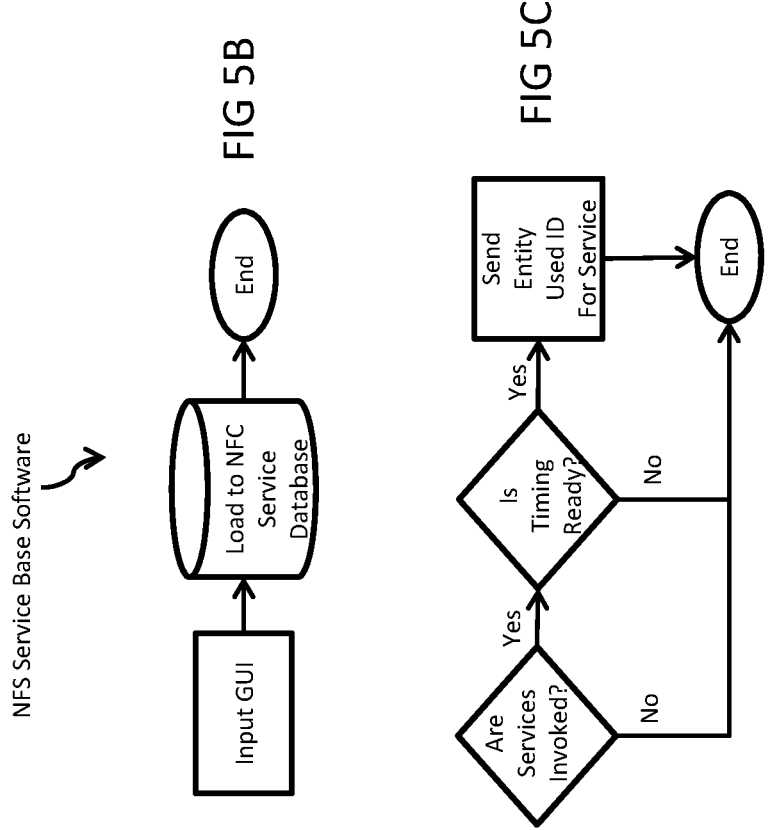
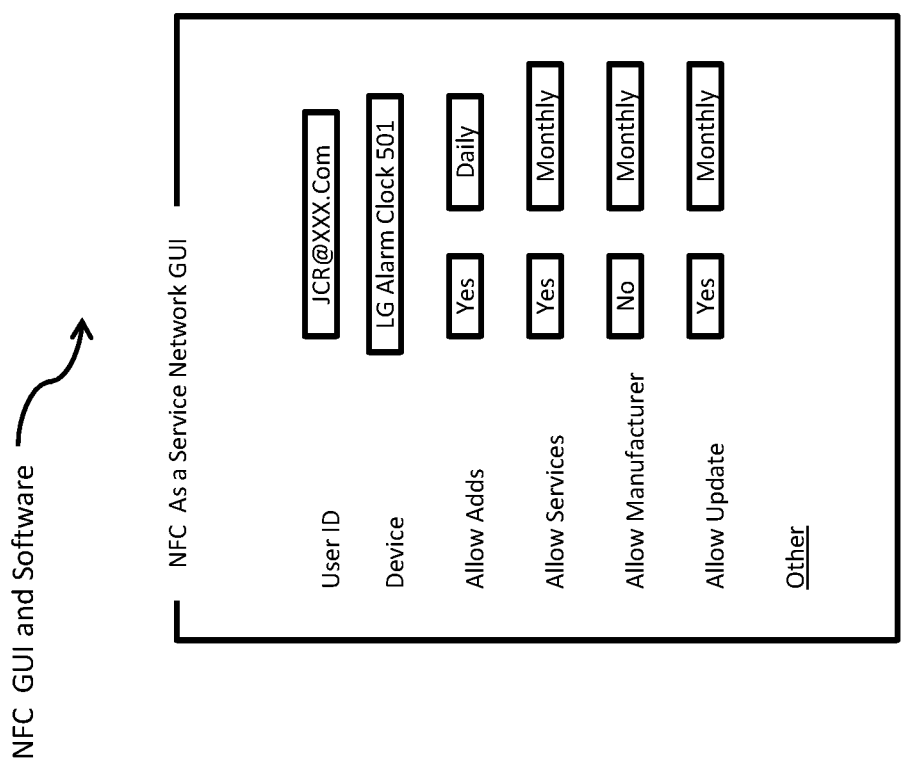

NFC Service Database

| Device Type | Device | Data Code File | NFC Web Link |
|---|---|---|---|
| Home | LG Alarm Clock 501 | LG AC 501.DAT | LGNFC.Com/NFC115 |
| Home | Treadmill Startac | TM 501.DAT | TM501.Com/Access |
| Home | ------ | ------ | ------ |
| Home | ------ | ------ | ------ |
| Retail | Wal-Mart | WM 101.DAT | WM101.Com/NFC5 |
| Retail | Home Depot | HD 577.DAT | HD577.Com/secure |
| Retail | ------ | ------ | ------ |
| Retail | ------ | ------ | ------ |
| Travel | Mercedes 230 2014 | M 23014.DAT | M23014.Com/NFC57 |
| Travel | Tube - London | TL 1111.DAT | TL1111.Com/Secure |
| Travel | ------ | ------ | ------ |
| Travel | ------ | ------ | ------ |

User NFC Database 

| Device Type | Allow Use | Real Time OS | Device | Data Code File | NFC Web Link |
|---|---|---|---|---|---|
| Home | Y | Y | LG Alarm Clock 501 | LG AC 501.DAT | LGNFC.Com/NFC115 |
| Home | N | Y | Treadmill Startac | TM 501.DAT | TM501.Com/Access |
| Home | --- | --- | --- | --- | --- |
| Home | --- | --- | --- | --- | --- |
| Retail | Y | Y | Wal-Mart | WM 101.DAT | WM101.Com/NFC5 |
| Retail | N | N | Home Depot | HD 577.DAT | HD577.Com/secure |
| Retail | --- | --- | --- | --- | --- |
| Retail | --- | --- | --- | --- | --- |
| Travel | Y | Y | Mercedes 230 2014 | M 23014.DAT | M23014.Com/NFC57 |
| Travel | Y | Y | Tube - London | TL 1111.DAT | TL1111.Com/Secure |
| Travel | Y | Y | Airlines | AA 517.DAT | Airlines.Com/571 |
| Travel | --- | --- | --- | --- | --- |

FIG 8

MANAGING NFC DEVICES BASED ON DOWNLOADED DATA

CROSS-REFERENCE TO RELATED APPLICATIONS

The present application is a continuation and claims the priority benefit of U.S. patent application Ser. No. 15/967,068 filed Apr. 30, 2018, now U.S. Pat. No. 10,348,368, which is a continuation and claims the priority benefit of U.S. patent application Ser. No. 14/970,102 filed Dec. 15, 2015, now U.S. Pat. No. 9,985,699, which claims the priority benefit of U.S. provisional application 62/092,671 filed Dec. 16, 2014, the disclosures of which are hereby incorporated by reference.

BACKGROUND

Field of Invention

The present invention generally relates to near field communication (NFC) devices. More specifically, the present invention is related to a near field communication center for storing and managing near field communication information.

Description of the Related Art

Near field communication (NFC) is a form of contactless communication between devices (e.g. smartphones or tablets). Contactless communication allows a user to motion (e.g. wave or pass) the device over other NFC compatible devices to send information without the need to provide physical contact between the devices or to undergo multiple steps to set up a connection between the devices.

NFC maintains interoperability between different wireless communication methods and other NFC standards through the NFC Forum. The NFC Forum enforces strict standards that manufactures must meet when designing NFC compatible devices. These standards ensure that NFC between devices is secure and remains easy-to-use with different versions of the technology.

The technology behind NFC allows a device (also referred to as a reader, interrogator or active device) to create a radio frequency (RF) current that is used to communicate with other NFC compatible devices or a small NFC tag holding information that might be of interest to the reader. Passive devices, such as the NFC tag, can be provided in posters and other forms of media or advertising. These passive devices store information and communicate with the reader but do not actively read other devices.

Peer-to-peer communication between two active devices is also possible with NFC. This communication would allow both devices to send and receive information between the two devices.

NFC devices are presently implemented in many products including alarm clocks, cars and point of sale (POS) terminals for payments. With the plethora of NFC interactions and potential applications aimed at controlling the NFC devices, however, it has become more difficult to manage all the NFC information related to the increasing number of NFC devices. Each particular NFC device may have its own capabilities, settings, and updates. Using a particular application for a particular NFC device can become further cumbersome and complicated when larger numbers of NFC devices become involved.

SUMMARY OF THE CLAIMED INVENTION

Embodiments of the present invention include systems and methods directed towards a near field communication (NFC) center that stores NFC information for various NFC devices. The NFC information stored in the center includes options and updates, service links, and manufacturing links for each respective NFC device. The NFC center facilitates the storing and control of the growing number of NFC devices.

BRIEF DESCRIPTION OF THE DRAWINGS

FIG. 1A illustrates a prior art method for authorization based on near field communication (NFC).

FIG. 1B illustrates a prior art method for payment based on NFC.

FIG. 5A illustrates an exemplary GUI that may be used in a system for providing an NFC center.

FIGS. 5B and 5C are flowcharts illustrating exemplary software methods for providing a service network for NFC transactions.

FIG. 8 illustrates an exemplary NFC user database found in the user mobile device that may be used in a system for providing an NFC center.

DETAILED DESCRIPTION

FIG. 1A illustrates a prior art method for authorization based on near field communication (NFC). In particular, the FIG. 1 shows a general credit card approval payment process and general payment process using NFC.

With reference to the basic authorization process, a customer can initiate the basic authorization process by buying one or more items with an NFC-compatible device (e.g., smart phone). The NFC-compatible device communicates with a merchant point of sales (POS) terminal, which can be a contactless terminal for NFC transactions.

Upon receiving a purchase request from the customer, the merchant terminal provides the request to the merchant bank. The merchant bank then forwards the request to the credit card payment processing. The credit card payment processing further forwards the request to the customer bank.

At the customer bank, a determination as to whether to approve or decline the request is made. This determination can be based on a variety of different parameters. The outcome of the determination (e.g., approved or declined)

can be provided back to the credit card company and the merchant bank. The merchant terminal is afterwards informed by the merchant bank about the authorization status for the recent purchases of the customer.

The basic authorization process further includes the Trusted Service Manager (TSM) and carrier with OTA (over-the-air) programming. The TSM acts as a neutral broker that sets up secure connections between different elements. In this case, the TSM can find the encryption codes for communications between the credit card payment systems and the customer bank. Meanwhile, the carrier with OTA programming may provide various methods for distributing new software updates, configuration settings and even updating encryption keys for the system.

FIG. 1B illustrates a prior art method for payment using NFC. Similar transactions are provided between the various elements (e.g., customer, merchant, credit card, TSM, carrier with OTA programming) as identified above for the basic authorization process. In particular, a merchant first sends settlement requests to the merchant bank. That request is forwarded to the credit card payment processing and to the customer bank. The customer bank then transfers the requested funds as necessary based on the request.

Figure 2:
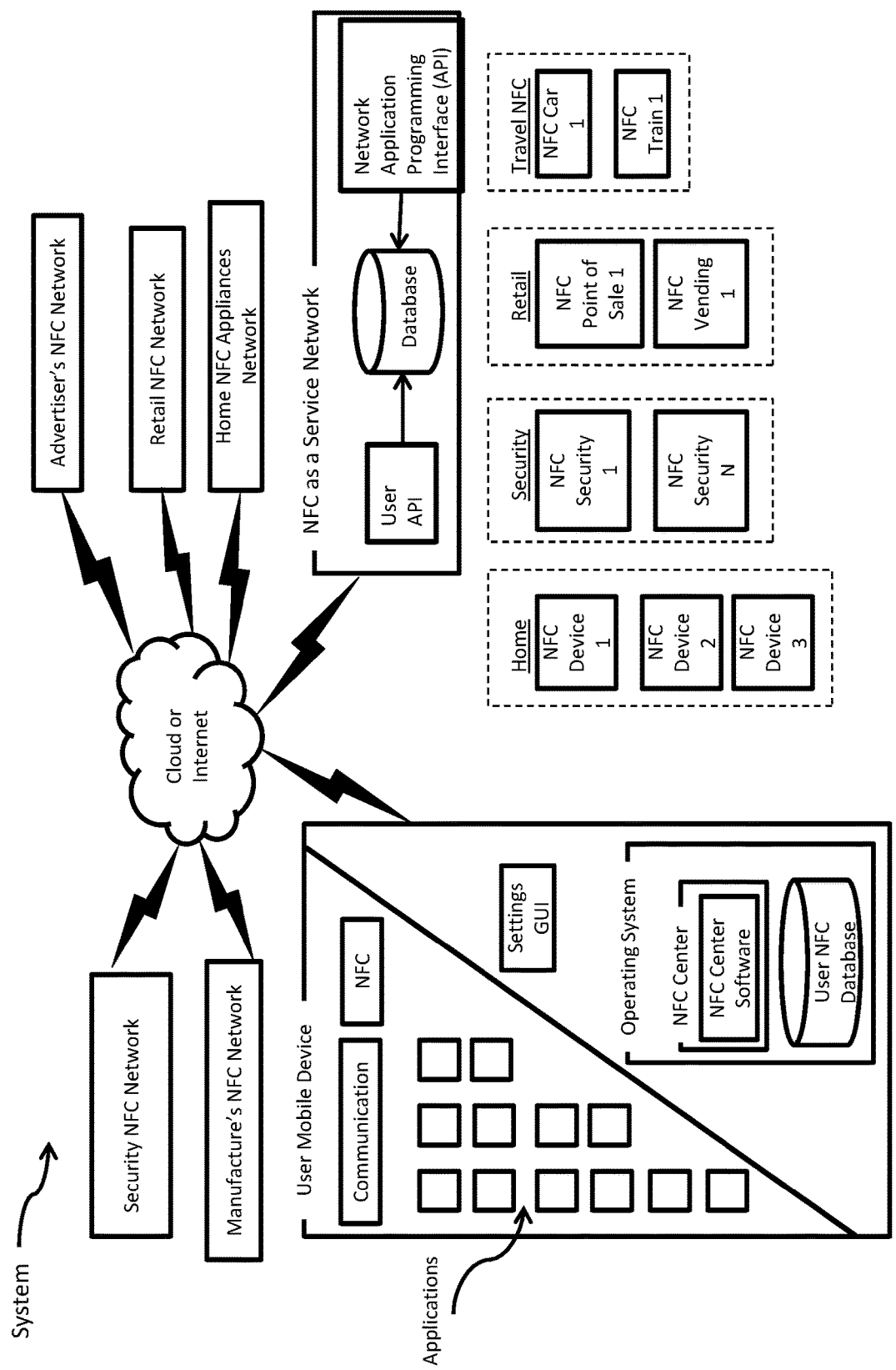
FIG. 2 illustrates a network environment in which an exemplary system for providing an NFC center may be implemented.

FIG. 2 illustrates a network environment in which an exemplary system for providing an NFC center may be implemented. The network environment may include a user mobile device, servers for such service networks for NFC transactions, manufacturer NFC network, security NFC network, advertisement NFC network, retail NFC network, at-home NFC appliances network, various home devices (e.g., NFC device 1, NFC device 2, and NFC device 3), NFC retail devices, NFC security devices, and NFC travel devices. These devices can be connected to the cloud/Internet in order to communicate with other device.

The user mobile device may include a number of different elements. The user mobile device may include a communications module, an NFC communications module, settings graphical user interface (GUI), an operating system (OS), one or more applications, and elements for NFC operations. The OS may include NFC center software and a user NFC database.

With respect to the service network for NFC transactions, such a network may include application programming interfaces (APIs) that are used to allow various users and networks to access a database. In particular, the network may include a user API and a network API. The various exemplary types of networks shown in FIG. 2 (e.g., advertiser, retail, home, security, and manufacturer) can all utilize the network API to load their respective information from their network into the database.

For example, a home NFC appliance device (e.g., alarm clock) can load information about itself into the NFC service network database through the use of the network API. The type of information that can be loaded into the database includes information about the alarm clock model, hyperlinks to the company website, and data files associated with the alarm clock that a user can download and use to update the particular alarm clock.

The NFC retail network can be provided as a network for one or more stores that could use the network API to log into the NFC service network and provide information about their POS terminal. For example, a store (e.g., Walmart) may use the network API to upload information about coupons in the NFC service network database. This can then allow anyone using an NFC device at Walmart to access the coupon information with their NFC user device.

The NFC advertiser network can also interact with the NFC service network using the network API. In particular, the advertiser network can provide information related to advertisements tied to products (e.g., home network appliances) to be stored in the network database. The advertiser network can also supply coupons and advertisements to other networks, including networks associated with the product.

The NFC security network corresponds with NFC compatible security devices. These security devices may use NFC, for example, to unlock a home door, control and unlock a car, or unlock a turn-style at a train station. The information that the security network can provide to the NFC service network database using the network API may include information about the security device, software associated with the security device, and hyperlinks to the device website.

The NFC manufacturer(s) network corresponds to the various devices which may be made by a respective manufacturer. A manufacturer (e.g., Samsung) may place information about its various products with corresponding model numbers into the NFC service network database.

It should be noted that information about a particular product may also be provided to the NFC service network database from two (or more) different networks. Information about a particular product can come, for example, from the manufacturer network corresponding to the manufacturer for the particular product, and from a more general network related to the product (e.g., NFC home appliances network if the product is considered a home appliance).

The user mobile device may then be able, through the use of the user API, to obtain access to the NFC service database. With the access, the user can browse and select particular products listed in the database. The information corresponding to the selected products can then be downloaded to the user mobile device (e.g., smart phone or particular device selected).

With the information obtained from the NFC service database, the user can then use the settings GUI on their user mobile device to customize and manage each NFC product. These settings may include the ability to turn on/off the device, authorizing and performing updates or enabling real-time operation.

The particular settings chosen by the user can then be stored in the mobile device NFC user database. The information about the settings is then usable when the user mobile device interacts with the one or more NFC products. The NFC center software then is able to use the information and determine what to do with respect to the one or more NFC products.

Different variations on the networks illustrated in FIG. 2 can also be provided so that NFC information from these different networks can also be stored and managed in a similar manner as described above.

Figure 3:
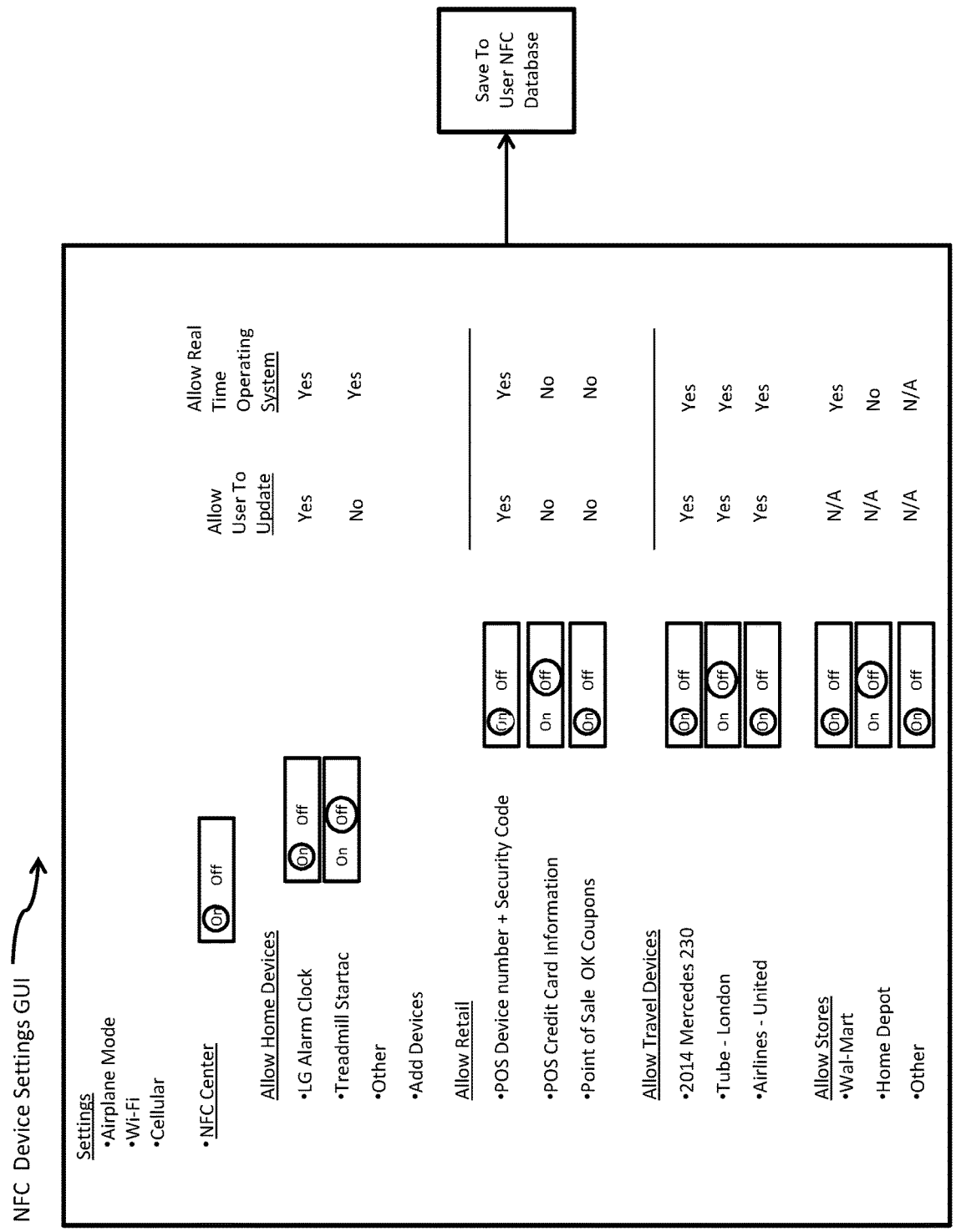
FIG. 3 illustrates an exemplary settings GUI found on a user mobile device that may be used in a system for providing an NFC center.

FIG. 3 illustrates an exemplary settings GUI found on a user mobile device. As seen in the figure, the GUI can include a variety of settings. The settings can be settings that can be found in most other phones (e.g., airplane mode, Wi-Fi, and cellular). Also shown in the figure are some settings which are directed to the present invention and therefore may not be found in other phones.

FIG. 3 illustrates an exemplary settings GUI found on a user mobile device that may be used in a system for providing an NFC center. Such a GUI can include a setting referencing the NFC center. In particular, the settings GUI can ask the user whether to turn on or off the NFC center. The settings GUI may further include a number of different subheadings with their own settings. These subheadings can include the available networks (as shown in FIG. 3) and a choice for the user to enable/disable communication with that particular network for one or more products/devices listed. Furthermore, additional options can be provided to provide real-time management of a particular NFC product/device by the OS of the user mobile device and to update the particular NFC product/device as needed.

The user can add additional NFC devices by interacting with the NFC service network as described above. Based on the user selecting more devices/products, the GUI can then include these additional NFC devices/products under the pre-existing subheadings or create new ones as necessary.

Aside from controlling NFC devices/products, the settings GUI can also be used by the user to control what types of information can be transmitted from the user mobile phone to the other networks. For example, settings can be provided regarding a POS terminal to allow transmission of the particular device number and security codes in order to receive updates and real-time operation. Furthermore, the user can determine what types of information can be provided (e.g., coupons) or should not be provided (e.g., credit card information).

Furthermore, the settings GUI can be used to allow the user to manage devices/products based on the user location. Based on the location of the user, travel devices can be enabled to update and operate in real time or alternatively disabled. For example, the illustrated settings GUI shows that user travel devices are enabled when they are identified as being in their car or on a plane, but are disabled when the user is identified as being on the tube. Furthermore, the user devices/products can similarly be enabled/disabled based on the user location in a particular store (e.g., Wal-Mart, Home Depot). In other embodiments, various parameters other than those listed may be further specified (e.g., providing particular airlines like Delta or United with their own settings).

Figure 4:
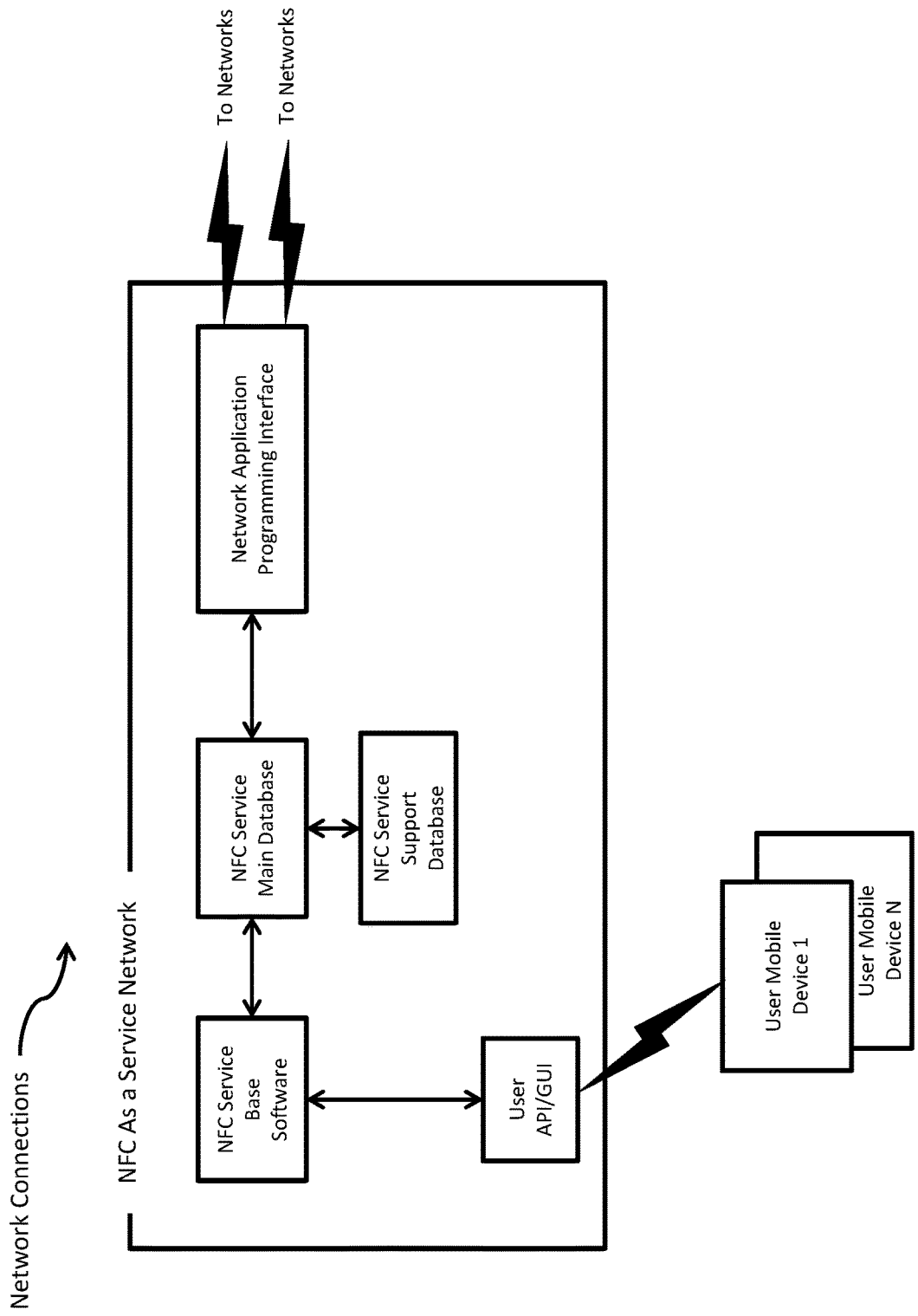
FIG. 4 illustrates an exemplary network for NFC transactions that may be used in a system for providing an NFC center.

FIG. 4 illustrates an exemplary service network for NFC transactions that may be used in a system for providing an NFC center. As illustrated, the NFC service network may include a main database and a support database. The main database may be where the various networks upload their information to be initially stored. In contrast, the support database may be used for logging user identification and facilitating user mobile devices with selection of one or more items stored in the main database.

The NFC service network may also include base software. The base software may poll the APIs for information from either the user mobile device (using the user API) or the devices/networks (using the network API). If information is obtained from the network API, the information may be stored in the main database. If information is obtained from the user API, the base software allows the user to interact with the support database.

FIG. 5 illustrates an exemplary GUI (FIG. 5A), as well as flowcharts (FIGS. 5B and 5C) illustrating methods for providing a NFC service network as described herein.

The user may be provided a GUI as shown in FIG. 5 when the user indicates a wish to interact with the NFC service network and use the support database. The GUI may include various parameters including user ID, NFC device ID, and user options regarding various advertisements, services, updates, and information from the manufacturer. The options may include frequency of communication in receiving the particular items (e.g., ads, services, information, and/or updates). Other options may be to allow the user to disable receiving data from one or more of those types or sources completely.

In general, the base software may be executed to perform the methods illustrated in FIGS. 5B and 5C. In FIG. 5B, input from the user may be received via the GUI and loaded into the support database. In FIG. 5C, the settings customized by the user may be applied to the various services for the selected NFC device/product.

Figure 6:
FIG. 6 illustrates an exemplary service database that may be used in a system for providing a service network for NFC transactions.

FIG. 6 illustrates an exemplary service support database found in the NFC service network. In particular, the support database may include information such as device type, device identification, data code files (e.g., files that may be used to manage or update the device), and links for the device (e.g., NFC web links). The information may be derived from information from the main database in which devices and/or networks uploaded information about products using the network API. As indicated above, the user is able to interact with the support database, select one or more NFC device/products from the support database, and download particular information for one or more devices/products from the support database to the user mobile device.

Figure 7:
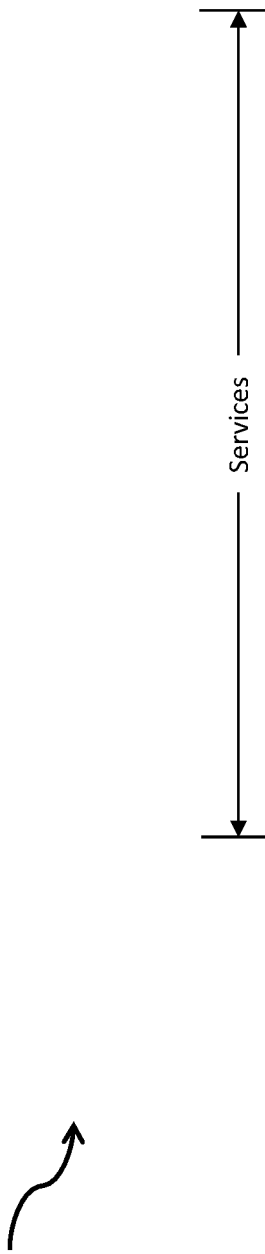
FIG. 7 illustrates another exemplary service support database that may be used in a system for providing a service network for NFC transactions.

FIG. 7 illustrates another exemplary service support database found in the NFC service network as described herein. In particular, the support database may include information that the user has uploaded to the NFC service network, which can look similar to the database illustrated in and discussed with respect to FIG. 6.

The information stored in the database of FIG. 7 may include information such as user ID, device/product identification, and settings for various services. This information can be information provided by the user through the GUI illustrated in FIG. 5.

FIG. 8 illustrates an exemplary NFC user database found in the user mobile device as described herein. In particular, the user database may include information such as device type, device identification, data code file, and web links. This information can be similar to the information stored in the NFC service support database. Instead of the information being stored on the support database in the network, the information may be stored locally on the user mobile device.

Figure 9:
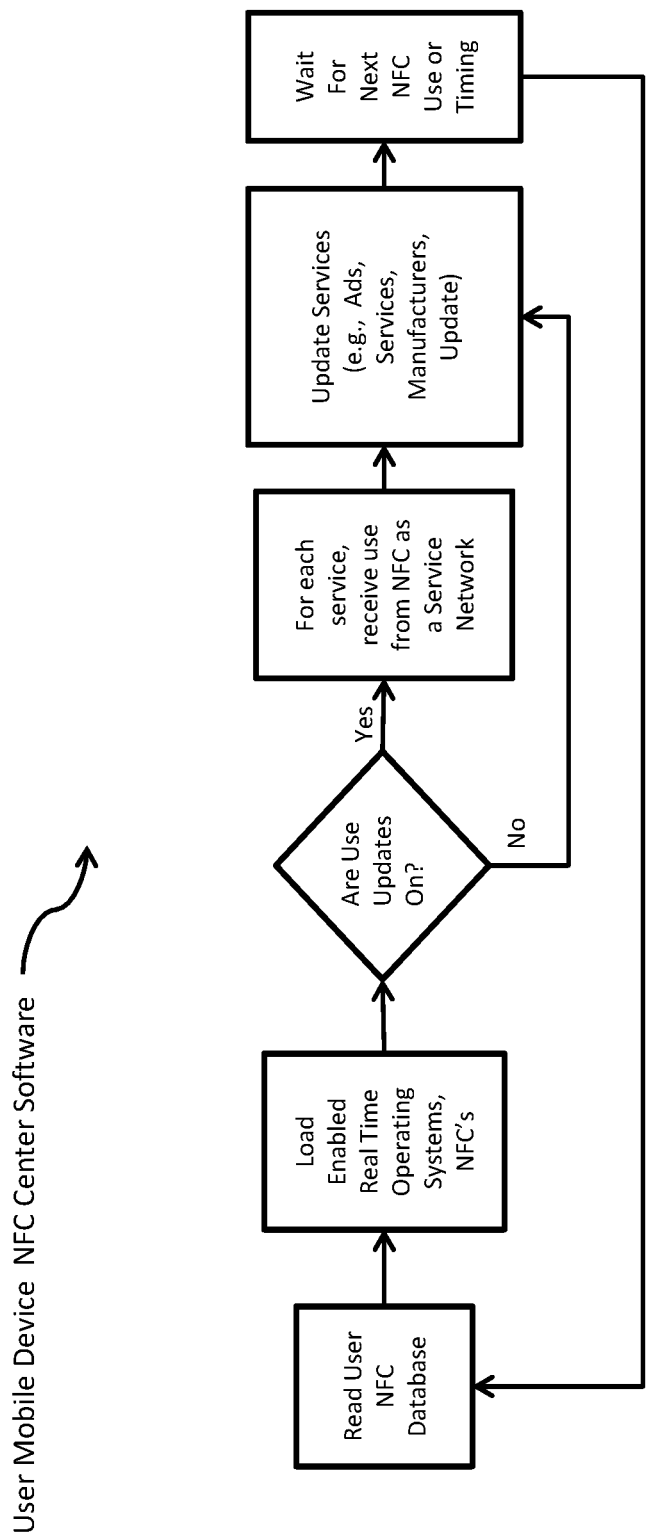
FIG. 9 is a flowchart illustrating an exemplary user mobile device method of providing a NFC center.

FIG. 9 is a flowchart illustrating an exemplary method for providing an NFC center. NFC center software may have access to the NFC user database and read the information stored therein.

After reading available data in the user database, the OS of the mobile device may be operated in real time, which may facilitate the run-time on the applications used by the mobile devices by removing a possible step of initiating the application prior to use.

Furthermore, the updates may be automatically searched and supplied to the devices by using related web links stored in the user database. The web links can be referenced to determine if there is an update available, and if so, the updates can then be applied for the next NFC.

Figure 10:
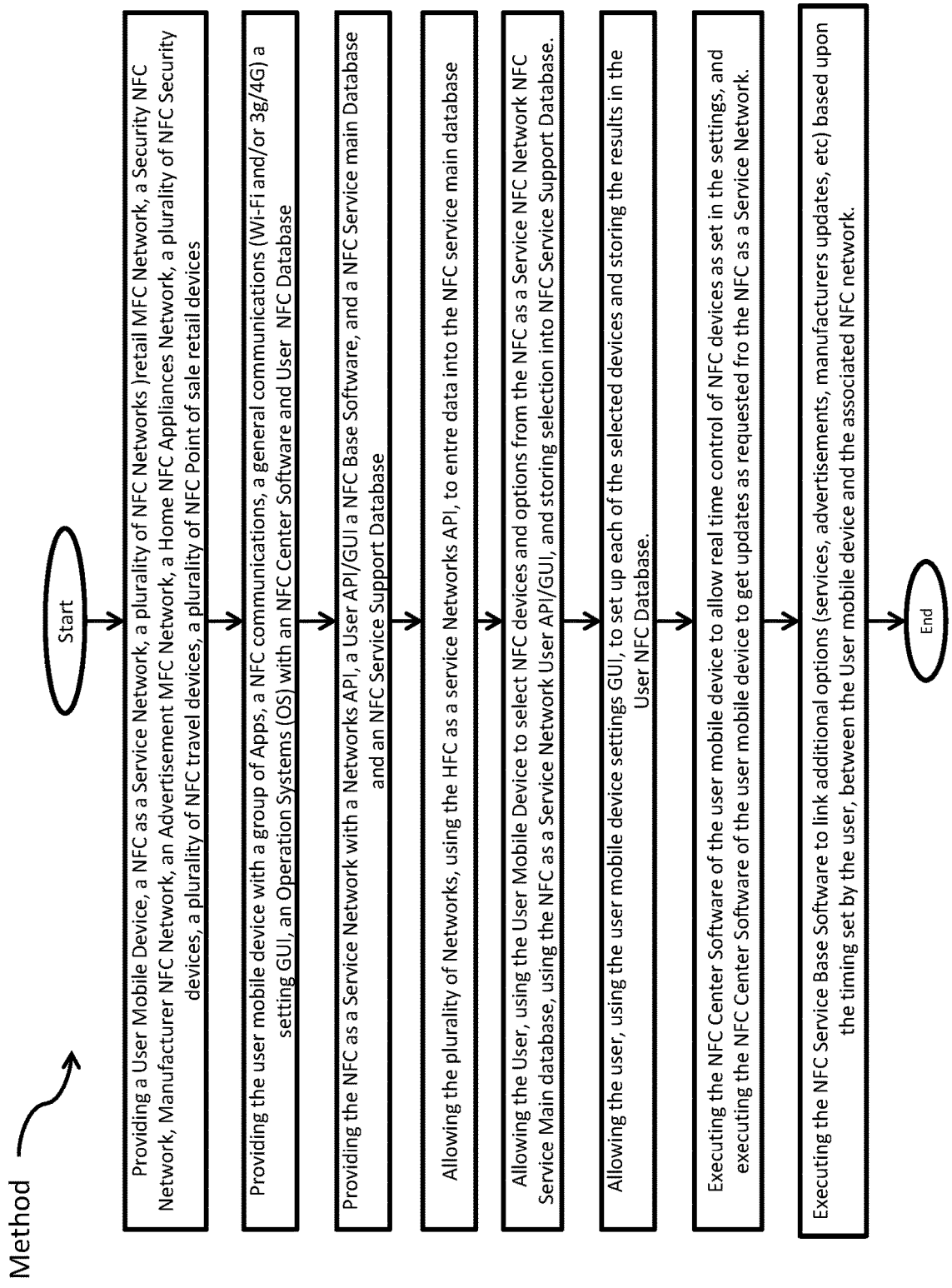
FIG. 10 is a flowchart illustrating an exemplary method of providing an NFC center.

FIG. 10 is a flowchart illustrating an exemplary method of providing an NFC center. A user mobile device, NFC service network, a plurality of NFC networks (e.g., retail NFC network, security NFC network, manufacturer NFC network, an advertisement NFC network, a home NFC appliance network), and a plurality of devices (e.g., NFC home devices, NFC-security devices, NFC travel devices, NFC POS devices) may be provided. The user device may include various applications for managing the NFC devices, NFC communications, a settings GUI, and an OS that has NFC center software, and a user NFC database. The NFC service network may have APIs, a GUI, base software, and databases.

The various networks may use the network API of the NFC service network to update the main database of the NFC service network with information about various NFC devices/products. The user is able to interact with the information using the user API and selecting one or more NFC devices/products using the support database. Based on the selection, the information may be stored locally on the user mobile device.

The user can then use the GUI on the user mobile device to set up each of the selected devices/products and store the information about the settings locally on the user mobile device or in the NFC service network support database. Use of the information from the network allows the user mobile device real-time control over the NFC devices that were selected by the user.

It should be noted that software may be stored in any various forms of non-transitory forms of memory as are known in the art. Software stored in memory may be executed by a processor or processing devices at a computing device, which may be mobile in nature such as a mobile phone or tablet device. The computing device executing the instructions from memory may have one or more communications interfaces that allow for connection to wired or wireless networks as well as interaction with wired or wireless devices, including NFC devices.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for location-based device customization, the method comprising:
   receiving customization input at a mobile device, wherein the customization input specifies a location-based operation of the mobile device to be enabled at one or more specified locations, wherein the location-based operation is disabled at another location, wherein the location-based operation is associated with a plurality of different services provided at the one or more specified locations;
   storing the customization input in association with the specified locations in memory;
   receiving a request specifying one of the services associated with the location-based operation;
   identifying that a current location of the mobile device corresponds to one of the specified locations associated with the specified service; and
   enabling the location-based operation of the mobile device for use in providing the service specified by the request based on the current location of the mobile device corresponding to one of the specified locations, wherein the enabled location-based operation is performed in accordance with the stored customization input specific to the specified service.

2. The method of claim 1, further comprising identifying that a new location of the mobile device no longer corresponds to any of the specified locations, and disabling the location-based operation of the mobile device.

3. The method of claim 1, further comprising defining the specified locations to include at least one location associated with a brand.

4. The method of claim 1, further comprising defining the specified locations based on proximity to another device.

5. The method of claim 4, wherein the other device is mobile.

6. The method of claim 1, further comprising defining the specified locations based on one or more parameters.

7. The method of claim 1, further comprising polling one or more devices or networks for information regarding the mobile device.

8. The method of claim 1, wherein the location-based operation includes providing a specified type of information.

9. A device for location-based device customization, the device comprising:
   an interface that:
      receives customization input specifying a location-based operation to be enabled at one or more specified locations, wherein the location-based operation is disabled at another location, and
      receives a request specifying one of services associated with the location-based operation, wherein the location-based operation is associated with a plurality of different services provided at the one or more specified locations;
   memory that stores the customization input in association with the specified locations; and
   a processor that executes instructions stored in memory, wherein execution of the instructions by the processor:
      identifies that a current location corresponds to one of the specified locations associated with the specified service, and
      enables the location-based operation in providing the service specified by the request based on the current location of a mobile device corresponding to one of the specified locations, wherein the enabled location-based operation is performed in accordance with the stored customization input specific to the specified service.

10. The device of claim 9, wherein the processor further identifies that a new location no longer corresponds to any of the specified locations, and disables the location-based operation.

11. The device of claim 9, wherein the processor further defines the specified locations to include at least one location associated with a brand.

12. The device of claim 9, wherein the processor further defines the specified locations based on proximity to another device.

13. The device of claim 12, wherein the other device is mobile.

14. The device of claim 9, wherein the processor further defines the specified locations based on one or more parameters.

15. The device of claim 9, wherein the processor further initiates polling of one or more other devices or networks for information regarding the device.

16. The device of claim 9, wherein the location-based operation includes providing a specified type of information.

17. A non-transitory computer-readable storage medium, having embodied thereon a program executable by a processor to perform a method for location-based device customization, the method comprising:

receiving customization input at a mobile device, wherein the customization input specifies a location-based operation of the mobile device to be enabled at one or more specified locations, wherein the location-based operation is disabled at another location, wherein the location-based operation is associated with a plurality of different services provided at the one or more specified locations;

storing the customization input in association with the specified locations in memory;

receiving a request specifying one of the services associated with the location-based operation;

identifying that a current location of the mobile device corresponds to one of the specified locations associated with the specified service; and enabling the location-based operation of the mobile device for use in providing the service specified by the request based on the current location of the mobile device corresponding to one of the specified locations, wherein the enabled location-based operation is performed in accordance with the stored customization input specific to the specified service.

\* \* \* \* \*